US012403795B2

(12) United States Patent
Cantos et al.

(10) Patent No.: US 12,403,795 B2
(45) Date of Patent: Sep. 2, 2025

(54) SEAT FITTINGS FOR ATTACHING SEATS TO SEAT TRACKS IN A VEHICLE AND RELATED SYSTEMS AND METHODS

(71) Applicant: The Boeing Company, Arlington, VA (US)

(72) Inventors: Jose A. Cantos, Brooklyn, NY (US); Brett D. Sjostrom, Champlin, MN (US); Kenneth M. LaSalle, Marysville, WA (US)

(73) Assignee: The Boeing Company, Arlington, VA (US)

( * ) Notice: Subject to any disclaimer, the term of this patent is extended or adjusted under 35 U.S.C. 154(b) by 267 days.

(21) Appl. No.: 18/159,415

(22) Filed: Jan. 25, 2023

(65) Prior Publication Data

US 2023/0166636 A1 Jun. 1, 2023

Related U.S. Application Data

(62) Division of application No. 16/746,189, filed on Jan. 17, 2020, now Pat. No. 11,584,259.

(51) Int. Cl.
*B60N 2/005* (2006.01)
*B64D 11/06* (2006.01)

(52) U.S. Cl.
CPC .......... *B60N 2/005* (2013.01); *B64D 11/0696* (2013.01)

(58) Field of Classification Search
CPC ............................ B60N 2/005; B64D 11/0696
USPC .................... 410/104, 102; 244/188.6, 188.1
See application file for complete search history.

(56) References Cited

U.S. PATENT DOCUMENTS

| | | | |
|---|---|---|---|
| 2,805,701 A | 9/1957 | Mccormick | |
| 2,835,226 A | 5/1958 | Fehlberg | |
| 3,605,637 A * | 9/1971 | Prete, Jr. | ................ B64D 9/003 410/105 |
| 3,652,050 A | 3/1972 | Marrujo et al. | |
| 4,771,969 A * | 9/1988 | Dowd | ................ B64D 11/0696 244/118.6 |
| 4,776,533 A | 10/1988 | Sheek et al. | |
| 4,796,837 A | 1/1989 | Dowd | |

(Continued)

FOREIGN PATENT DOCUMENTS

| DE | 102010063615 A1 | 2/2012 |
|---|---|---|
| EP | 0922632 A2 | 6/1999 |

(Continued)

OTHER PUBLICATIONS

Jawara, "Aircraft Seat Track", The Best and Latest Aircraft 2018, published at krotoku.com/aircraft-seat-track, published on Feb. 6, 2015, 13 pages.

(Continued)

*Primary Examiner* — Kimberly T Wood
(74) *Attorney, Agent, or Firm* — Hanley, Flight & Zimmerman, LLC

(57) ABSTRACT

Seat fittings for attaching seats to seat tracks in a vehicle and related systems and methods are described herein. An example seat fitting includes a body having a bottom surface to face a seat track, a locking stud, and a solenoid disposed in the body. The solenoid is operable to move the locking stud between a retracted position in which the locking stud is disposed in the body and an extended position in which the locking stud extends outward from the bottom surface of the body and into the seat track.

20 Claims, 11 Drawing Sheets

(56) References Cited

U.S. PATENT DOCUMENTS

| | | | |
|---|---|---|---|
| 5,083,726 | A | 1/1992 | Schurr |
| 5,433,550 | A | 7/1995 | Huber |
| 6,186,477 | B1 | 2/2001 | McCombs et al. |
| 6,260,813 | B1 | 7/2001 | Whitcomb |
| 6,601,798 | B2 | 8/2003 | Cawley |
| 7,021,596 | B2 | 4/2006 | Lory |
| 7,029,215 | B2 | 4/2006 | Dowty |
| 7,334,758 | B2 | 2/2008 | Williamson et al. |
| 7,455,276 | B2 | 11/2008 | Frey |
| 7,506,855 | B2 | 3/2009 | Frantz et al. |
| 7,713,009 | B2 * | 5/2010 | Hudson .............. B64D 11/0696 410/104 |
| 7,837,145 | B2 | 11/2010 | Wodak |
| 7,975,979 | B2 | 7/2011 | Bishop |
| 8,074,954 | B2 | 12/2011 | Wilhelm et al. |
| 8,128,326 | B2 * | 3/2012 | Hudson .............. B64D 11/0696 410/104 |
| 8,292,224 | B1 | 10/2012 | Ahad et al. |
| 8,371,781 | B2 | 2/2013 | Roy et al. |
| 8,474,756 | B2 | 7/2013 | Allain et al. |
| 8,528,860 | B2 | 9/2013 | VanderWolk |
| 8,602,702 | B2 | 12/2013 | Roy et al. |
| 8,608,125 | B2 | 12/2013 | Grether et al. |
| 9,567,086 | B2 | 2/2017 | Siegmeth |
| 9,663,232 | B1 | 5/2017 | Porter et al. |
| 10,046,847 | B2 | 8/2018 | Cullen et al. |
| 10,179,651 | B2 | 1/2019 | Olulana et al. |
| 10,259,585 | B2 | 4/2019 | Sodore |
| 10,807,501 | B2 | 10/2020 | Gross |
| 11,040,638 | B2 | 6/2021 | Condamin et al. |
| 2005/0173608 | A1 | 8/2005 | Lory |
| 2007/0122254 | A1 | 5/2007 | LaConte et al. |
| 2010/0026283 | A1 | 2/2010 | Nishide |
| 2010/0108808 | A1 | 5/2010 | Allain et al. |
| 2013/0206953 | A1 | 8/2013 | Eckenroth |
| 2021/0061134 | A1 | 3/2021 | Sjostrom et al. |
| 2021/0155127 | A1 | 5/2021 | Last |
| 2021/0221257 | A1 | 7/2021 | Cantos et al. |

FOREIGN PATENT DOCUMENTS

| | | |
|---|---|---|
| EP | 0922632 A3 | 8/2000 |
| JP | S63050740 U | 4/1988 |
| JP | H02279433 A | 11/1990 |
| JP | 2001171395 A | 6/2001 |
| JP | 2013534193 A | 9/2013 |
| WO | 2005108149 | 11/2005 |

OTHER PUBLICATIONS

Bishop GMBH Aeronautical Engineers, "The New 1/2 Inch Filling Product Has Been Tested and Is Ready for the Market", published at https://www.bishop-gmbh.com/index.php?page=specialprograms, Hamburg, Germany, 2017specialprograms, Hamburg, Germany, 2017, 8 pages.

Recaro CL3710, The New Dimension, Economy Class Seating, published at https://www.recaro-as.com/en/aircraft-seats/economy-class/cl3710.html, at least as early as May 24, 2019, 2 pages.

Runway Girl Network, "Half-inch seat filling promises seat pitch flexibility; what of #PaxEx," published at https://runwaygirlnetwork.com/2016/10/25/half-inch-seat-filling-promises-seat-pilch-flexibilily-what-of-paxex/,Oct. 25, 2016, 5 pages.

Bishop GMBH Aeronautical Engineers, "FSAS Flexible Seat Arrangement System, Manual Light Reconfiguration", Hamburg, Germany, at least as early as May 24, 2019, 1 page.

European Patent Office, "European Search Report," issued in connection with EP Application No. 20209300.1, dated May 10, 2021, 8 pages.

United States Patent and Trademark Office, "Restriction Requirement," issued in connection with U.S. Appl. No. 16/746,189, dated Nov. 8, 2021, 11 pages.

United States Patent and Trademark Office, "Non-Final Office Action," issued in connection with U.S. Appl. No. 16/746,189, dated Apr. 20, 2022, 10 pages.

United States Patent and Trademark Office, "Notice of Allowance and Fee(s) Due," issued in connection with U.S. Appl. No. 16/746,189, dated Nov. 1, 2022, 8 pages.

Japan Patent Office, "Search Report by Registered Search Organization," issued in connection with Japanese Patent Application No. 2021004893, dated Jun. 21, 2024, 24 pages. (Machine Translated English Included).

Japan Patent Office, "Notice of Reasons for Refusal," issued in connection with Japanese Patent Application No. 2021004893, dated Jun. 12, 2024, 8 pages. (Machine Translated English Included).

* cited by examiner

1300 ⤦

1302
Energize a Solenoid in a Seat Fitting Coupled to a Seat to Release the Seat Fitting from a Seat Track in a Vehicle

1304
Move the Seat from a First Location to a Second Location while the Solenoid is Energized

1306
De-energize the Solenoid to Attach the Seat Fitting to the Seat Track while the Seat is at the Second Location

FIG. 13

SEAT FITTINGS FOR ATTACHING SEATS TO SEAT TRACKS IN A VEHICLE AND RELATED SYSTEMS AND METHODS

RELATED APPLICATIONS

This patent arises from a divisional of U.S. patent application Ser. No. 16/746,189, which was filed on Jan. 17, 2020. U.S. patent application Ser. No. 16/746,189 is hereby incorporated herein by reference in its entirety. Priority to U.S. patent application Ser. No. 16/746,189 is hereby claimed.

FIELD OF THE DISCLOSURE

This disclosure relates generally to seat fittings, and, more particularly, to seat fittings for attaching seats to seat tracks in a vehicle and related systems and methods.

BACKGROUND

Modern vehicles, such as aircraft, buses, trains, subways, etc., often include rows of seats or benches. The seats or benches are connected to tracks disposed in the floor of the vehicle. The seats or benches can be disconnected from the seat tracks and rearranged depending on a desired spacing and/or configuration.

SUMMARY

An example seat fitting for attaching a seat to a seat track in a vehicle is disclosed herein. The example seat fitting includes a body having a bottom surface to face a seat track, a locking stud, and a solenoid disposed in the body. The solenoid is operable to move the locking stud between a retracted position in which the locking stud is disposed in the body and an extended position in which the locking stud extends outward from the bottom surface of the body and into the seat track.

An example method disclosed herein includes energizing a solenoid in a seat fitting coupled to a seat to release the seat fitting from a seat track in a vehicle, moving the seat from a first location to a second location while the solenoid is energized, and de-energizing the solenoid to attach the seat fitting to the seat track while the seat is at the second location.

An example seat attachment system disclosed herein includes a seat fitting to be coupled to a seat. The seat fitting includes a body having a top surface and a bottom surface. A channel is defined between the top surface and a recess formed in the bottom surface. The seat fitting also includes a locking stud disposed in the recess. The locking stud is movable between a retracted position and an extended position. The seat fitting further includes a plunger disposed in the channel and coupled to the locking stud. The plunger has an opening. The seat fitting also includes a pin that is insertable into the opening in the plunger to hold the locking stud in the extended position. The seat attachment system further includes a tool to remove the pin from the opening.

BRIEF DESCRIPTION OF THE DRAWINGS

FIG. 13 is a flowchart representative of an example method to adjust a location of a seat in a vehicle that may be performed with any the example seat attachment systems of FIGS. 7, 11, and 12.

The figures are not to scale. Instead, the thickness of the layers or regions may be enlarged in the drawings. In general, the same reference numbers will be used throughout the drawing(s) and accompanying written description to refer to the same or like parts.

Figure 1:
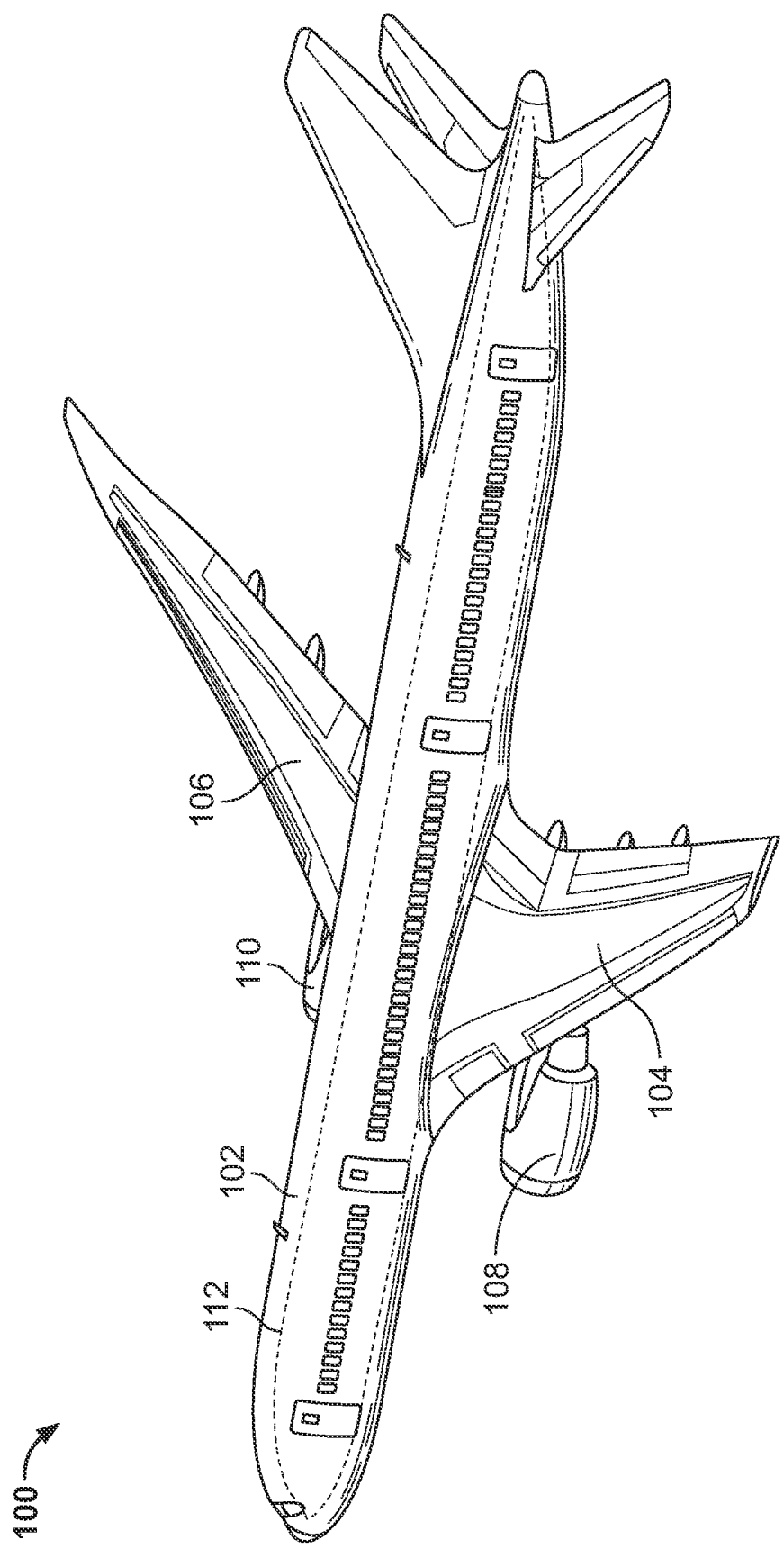
FIG. 1 illustrates an example aircraft in which the examples disclosed herein can be implemented.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Disclosed herein are example seat fittings for attaching a seat to a floor in a vehicle. The example seat fittings disclosed herein are easier and quicker to use for attaching and detaching the seat to/from the floor. As such, the examples disclosed herein reduce the amount of time needed to rearrange or reconfigure one or more seats in a vehicle.

Known vehicles, such as aircraft, buses, trains, etc., often include one or more rows of seats for passengers to sit in a cabin of the vehicle. Each seat is removably coupled to a pair of seat tracks in the floor of the cabin. The seat tracks extend lengthwise through the cabin of the vehicle. The seats can be detached from the seat tracks and rearranged or reconfigured. For example, the seats can be moved further apart or closer together. Further, one or more seats can be completely removed from the vehicle and/or one or more new seats can be added to the vehicle. It is often desired to rearrange the seats. For example, between flights on an aircraft, it may be desired to rearrange the seats to increase or decrease the spacing between the rows of seats.

In known seat attachment systems, each seat is coupled to the seat tracks via seat fittings. The seat fittings are coupled to the legs of the seat. Each seat fitting includes a movable locking stud and a plurality of fixed studs. To attach a seat to the seat tracks, a person (e.g., a vehicle crew member) places the seat fittings on the seat tracks such that the fixed studs are inserted into notches formed in the seat tracks. Then, for each seat fitting, the person screws a threaded shaft (e.g., a bolt) into a body of the seat fitting to deploy the locking stud, which locks the seat fitting (and, thus, the seat) to the seat track. The threaded shaft may be rotated via an Allen wrench or electric drill, for example. To detach the seat from the seat tracks, the person may unscrew the threaded shaft of each of the seat fittings. Then the seat can be removed from the seat tracks and/or moved to another location along the seat tracks.

This process of screwing the threaded shaft to deploy/retract the locking stud takes considerable time. Further, each seat may have four seat fittings. Thus, the person has to perform the same operation four times to attach/detach one seat to/from the seat tracks. This operation becomes even more time consuming if the vehicle has multiple seats. For example, some aircraft have tens or hundreds of seats. Therefore, it can take significant time for a person to rearrange the seats in the vehicle cabin.

Disclosed herein are example seat fittings that are easier and quicker to operate for attaching and detaching a seat to/from a seat track. An example mechanically actuated seat fitting disclosed herein includes a body and a locking stud that is movable relative to the body. The locking stud is movable between a retracted position in which the locking stud is disposed in a recess formed in a bottom surface of the body and an extended position in which the locking stud is moved outward from the bottom surface of the body. The example seat fitting includes a plunger disposed in a channel extending between a top surface of the body and the recess formed in the bottom surface of the body. The plunger is coupled to the locking stud. The plunger extends outward from the top surface of the body. To move the locking stud from the retracted position to the extended position, a vehicle operator can push down on the top of the plunger, which moves the locking stud outward from the body to the extended position. For example, the vehicle operator may step on the top of the plunger with his/her foot. Then, the vehicle operator may insert a pin into the plunger to lock the locking stud in the extended position, which locks the seat fitting to the seat track and, thus, locks the seat to the seat track.

To unlock the seat fitting from the seat track, the person can remove the pin, which enables the plunger to move the locking stud back to the retracted position (e.g., via biasing force from a spring). In some examples, a tool is used to insert and/or remove the pin. This process of pushing down on the plunger and/or inserting/removing the pin is relatively quick compared to the known process of screwing the threaded shaft. Thus, a person can more quickly and efficiently attach or detach the seat fitting(s) to/from the seat track. This also prevents or reduces the amount of time a person has to be crouched or bent over when operating the seat fittings.

Also disclosed herein are example electro-mechanically actuated seat fittings. An example electro-mechanically actuated seat fitting disclosed herein includes a solenoid disposed in a body of the seat fitting. The seat fitting also includes a locking stud coupled to the solenoid. The solenoid is operable to move the locking stud between a retracted position in which the locking stud is disposed in the body and an extended position in which the locking stud extends outward from the bottom surface of the body and into the seat track. In some examples, the solenoid moves the locking stud to the retracted position when the solenoid is energized, and the solenoid moves the mechanical locking stud (e.g., via biasing force from a spring) to the extended position when the solenoid is de-energized. Therefore, the seat fitting may be unlocked from the seat track by energizing the solenoid, and the seat fitting may be locked to the seat track by de-energizing the solenoid.

In some examples disclosed herein, the solenoids in the seat fittings are energized by attaching a tool to an interface on the seat. The tool may include a power source. When the tool is attached to the interface on the seat, the power source energizes the solenoids in the seat fittings, which unlocks the seat fittings from the seat tracks. Then, the seat can be moved to another location and/or completely removed from the cabin of the vehicle. When the seat is in a new desired location, the tool can be removed from the interface. When the tool is removed from the interface, the solenoids are de-energized, and the locking studs are deployed, which locks the seat fittings to the seat tracks and, thus, locks the seat to the seat tracks.

While the examples disclosed herein are described in connection with seats on an aircraft, it is understood that any of the examples disclosed herein can be similarly implemented in connection with other vehicles, such as a bus, a train, or a boat.

Now turning to the figures, FIG. 1 illustrates an example vehicle in which in which the examples disclosed herein can be implemented. In this example, the vehicle is an aircraft 100. The aircraft 100 includes a fuselage 102, a first wing 104 (a left wing) coupled to the fuselage 102, and a second wing 106 (a right wing) coupled to the fuselage 102. In the illustrated example, the aircraft 100 includes a first engine 108 carried by the first wing 104 and a second engine 110 carried by the second wing 106. In other examples, the aircraft 100 may include only one engine or may include more than two engines. The fuselage 102 defines a cabin 112 (shown in dashed lines) where passengers and cargo are carried. The cabin 112 may contain one or more seats for the passengers and/or flight crew.

Figure 2:
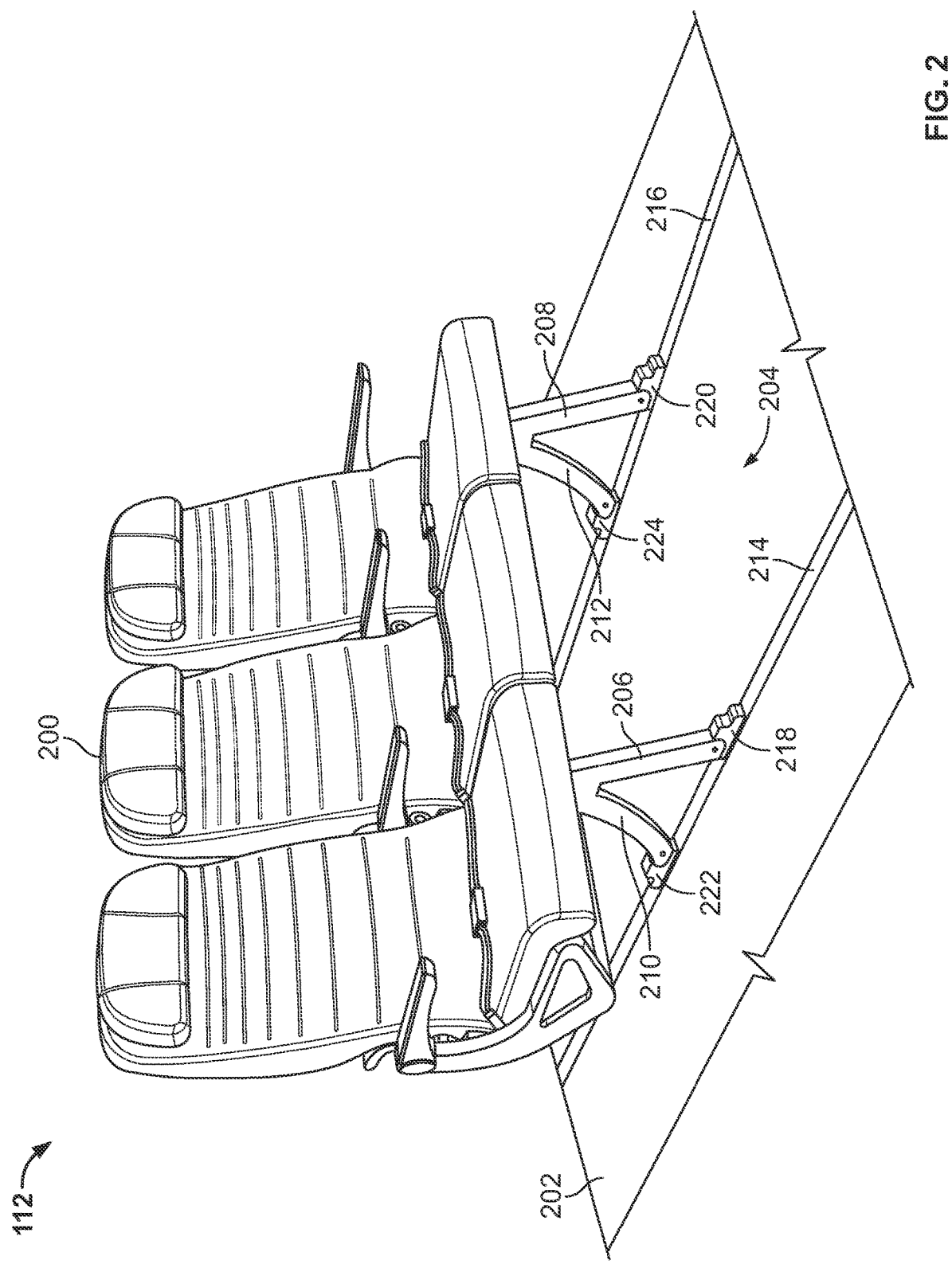
FIG. 2 illustrates an example seat and an example seating attachment system including example seat tracks and example seat fittings that may be used to attach the seat to a floor in a cabin of the aircraft of FIG. 1.

FIG. 2 illustrates an example seat 200 coupled to an example floor 202 in the cabin 112 of the aircraft 100 (FIG. 1) via an example seat attachment system 204 constructed in accordance with the teachings of this disclosure. The seat attachment system 204 is used to removably couple the seat 200 to the floor 202. While only one seat 200 is shown, it is understood that cabin 112 may include multiple rows of seats, the same as or different than the seat 200, disposed in front of and/or behind the seat 200. In the illustrated example, the seat 200 includes three individual seating positions (e.g., forming a seat unit or bench). In other examples, the seat 200 may include more or fewer individual seating positions (e.g., one, two, four, five, etc.).

In the illustrated example, the seat 200 includes four legs, including a first leg 206, a second leg 208, a third leg 210, and a fourth leg 212. In the other examples, the seat 200 can include more or fewer legs. The seat attachment system 204 includes seat fittings for attaching the legs 206-212 to example first and second seat tracks 214, 216 disposed in the floor 202 of the cabin 112. In particular, in this example, the seat attachment system 204 includes a first seat fitting 218 coupled to the first leg 206, a second seat fitting 220 coupled to the second leg 208, a third seat fitting 222 coupled to the third leg 210, and a fourth seat fitting 224 coupled to the fourth leg 212. The first and third seat fittings 218, 222 couple the respective first and third legs 206, 210 to the first seat track 214, and the second and fourth seat fittings 220, 224 couple the respective second and fourth legs 208, 212 to the second seat track 216. The seat fittings 218-224 can be coupled (e.g., locked) to the first and second seat tracks 214, 216 to attach to the seat 200 to the floor 202, or decoupled (e.g., unlocked) from the first and second seat tracks 214, 216 to detach the seat 200 from the floor 202. For example, the seat 200 can be detached from the first and second seat tracks 214, 216 and moved to another location on the first and second seat tracks 214, 216 and re-attached to the first and second seat tracks 214, 216.

The first and second seat tracks 214, 216 may be flush with the floor 202 or recessed below the floor 202. In some examples, carpeting or other flooring material is disposed over the first and second seat tracks 214, 216 between the rows of seats. The first and second seat tracks 214, 216 may be relatively long (e.g., 30 feet), such that multiple rows of seats can be coupled to the first and second seat tracks 214, 216. For example, the first and second seat tracks 214, 216 may extend along a length of the fuselage 112 (FIG. 1). The other seats in the cabin 112 may also be attached to the first and second seat tracks 214, 216 via seat fittings. The seats in the cabin 112 can be disconnected from the first and second seat tracks 214, 216 and rearranged or reconfigured (e.g., spaced closer together, spaced further apart, removed from the cabin 112, etc.).

Figure 3:
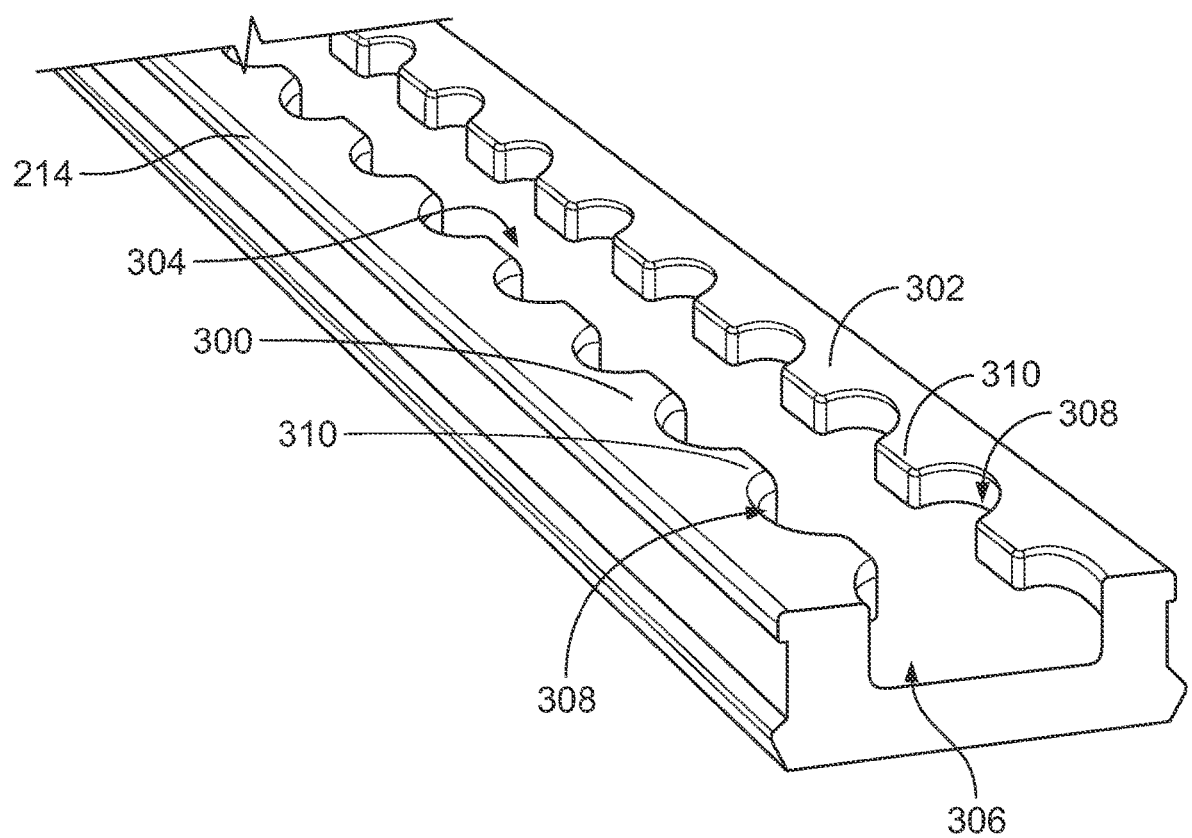
FIG. 3 illustrates a section of an example seat track of the example seat attachment system of FIG. 2.

FIG. 3 illustrates a section of the first seat track 214. The second seat track 216 (FIG. 2) is identical to the first seat track 214. Therefore, any structures or functions disclosed in connection with the first seat track 214 can likewise apply to the second seat track 216. In the illustrated example, the first seat track 214 has a first flange 300 and a second flange 302 separated from the first flange 300 by a slot 304. A channel 306 is defined below the first and second flanges 300, 302. In this example, the first and second flanges 300, 302 have circular grooves or notches 308 (one of which is referenced on each of the first and second flanges 300, 302). Teeth or ribs 310 are formed between the notches 308. The ribs 310 define discrete positions at which the seat fittings can be coupled to the first seat track 214, as disclosed in further detail herein.

Figure 4:
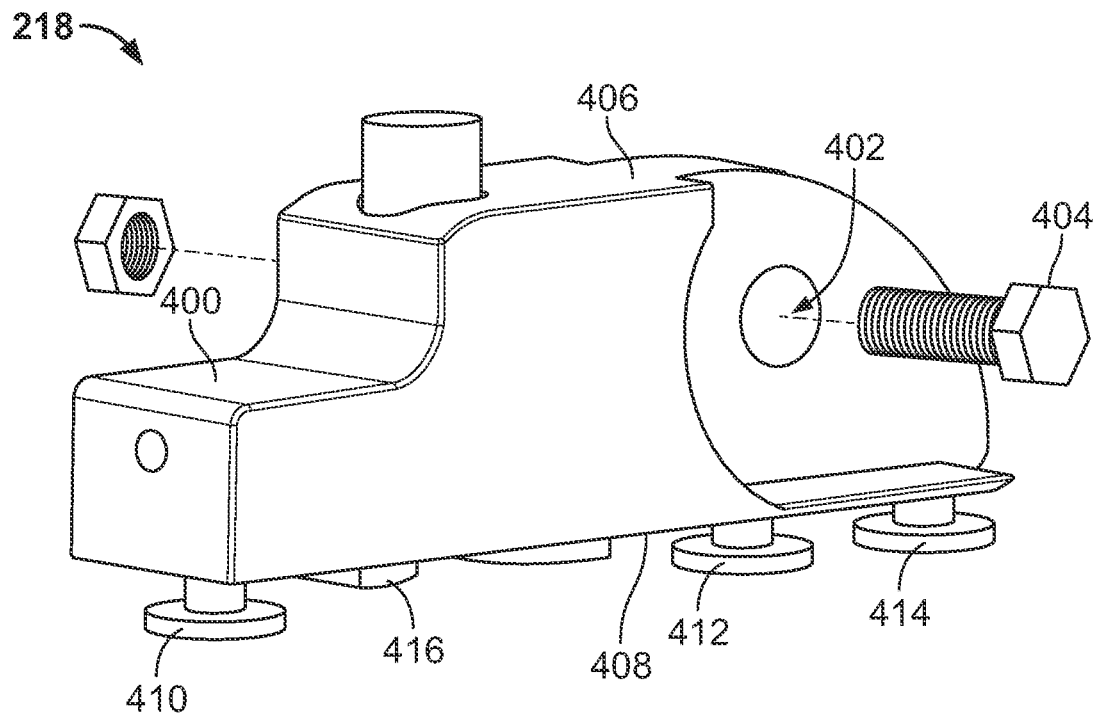
FIG. 4 is a top perspective view of an example seat fitting of the example seat attachment system of FIG. 2.
Figure 5:
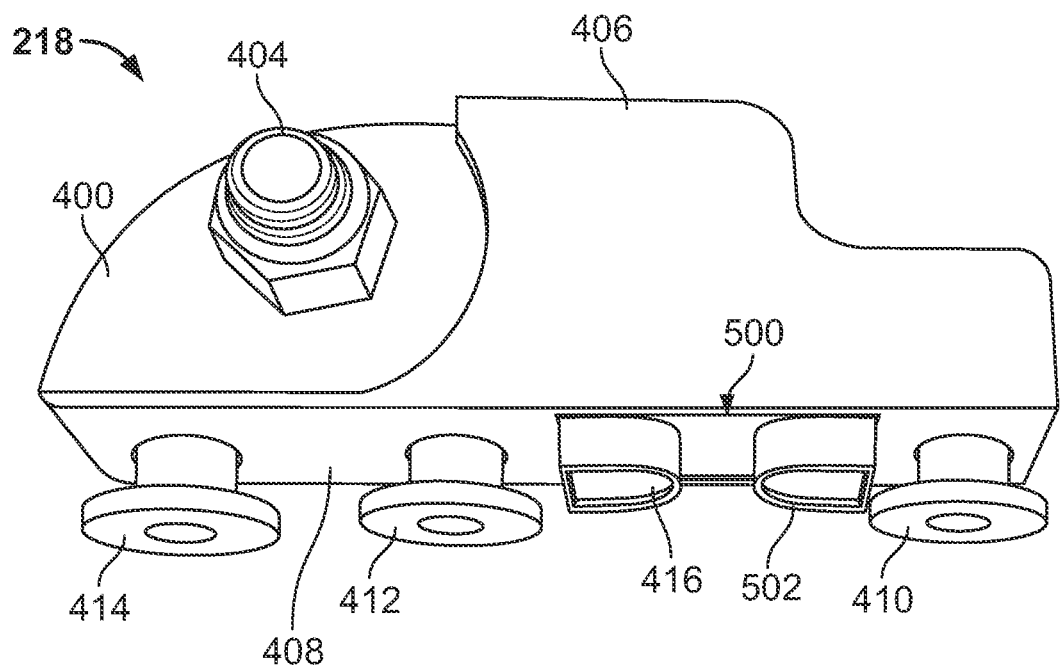
FIG. 5 is a bottom perspective view of the example seat fitting of FIG. 4.

FIGS. 4 and 5 are perspective views of the first example seat fitting 218. The second, third, and fourth seat fittings 220, 222, 224 are identical to the first seat fitting 218. Therefore, any structures or functions disclosed in connection with the first seat fitting 218 can likewise apply to the second, third, and fourth seat fittings 220, 222, 224.

As shown in FIGS. 4 and 5, the first seat fitting 218 includes a body 400. In some examples, the body 400 is constructed of metal, such as aluminum. In other examples, the body 400 can be constructed of other materials (e.g., plastic). The body 400 is to be coupled to the first leg 206 (FIG. 2). In the illustrated example, the body 400 has a fastener opening 402. A fastener 404 (e.g., a bolt) is inserted through the fastener opening 402 and a corresponding opening in the first leg 206 to couple the body 400 to the first leg 206. In other examples, the first seat fitting 218 can be coupled to the first leg 206 via other mechanical and/or chemical fastening techniques (e.g., a rivet, friction fit, welding, an adhesive, etc.).

In the illustrated example, the body 400 has a top side or surface 406 and a bottom side or surface 408. The bottom surface 408 is to face the first seat track 214 (FIGS. 2 and 3) when the first seat fitting 218 is coupled to the first seat track 214. In some examples, when the first seat fitting 218 is coupled to the first seat track 214, the bottom surface 408 contacts or engages the first seat track 214.

To slidably couple the first seat fitting 218 to the first seat track 214 (FIG. 2), the first seat fitting 218 includes one or more fixed studs. In this example, the first seat fitting 218 includes a first fixed stud 410, a second fixed stud 412, and a third fixed stud 414. The first, second, and third fixed studs 410-414 are coupled and extend from the bottom surface 408 of the body 400. Each of the first, second, and third studs 410-414 has a stem portion and a circular disc portion. The first, second, and third fixed studs 410-414 are spaced apart such that when the first seat fitting 218 is placed on top of the first seat track 214, all three of the first, second, and third fixed studs 410-414 can be simultaneously inserted into corresponding notches 308 (FIG. 3) and into the channel 306 (FIG. 3) in the first seat track 214. Once the first, second, and third fixed studs 410-414 are inserted in the channel 306, the first seat fitting 218 can be slid in either direction along the first seat track 214. When the first, second, and third fixed studs 410-414 are located under the ribs 310 (FIG. 3), the first seat fitting 218 is prevented from being pulled out from the first seat track 214. This occurs at certain increments defined by the spacing between the ribs 310. While in this example the first seat fitting 218 includes three fixed studs, in other examples, the first seat fitting 218 can include more (e.g., four, five, etc.) or fewer (e.g., one, two) fixed studs.

To lock the first seat fitting 218 at a specific position along the first seat track 214 (FIGS. 2 and 3), the example first seat fitting 218 includes a locking stud 416. In this example, the locking stud 416 is formed by two opposing half circles. The locking stud 416 is movable up and down from the bottom surface 408 of the body 400. As shown in FIG. 5, a recess 500 is formed in the bottom surface 408 of the body 400. The locking stud 416 is disposed in the recess 500. The locking stud 416 is movable into and out of the recess 500. The locking stud 416 is movable between a first position, referred to as a retracted position, and a second position, referred to as an extended position (which is the position shown in FIGS. 4 and 5). In the retracted position, the locking stud 416 is disposed in the recess 500 such that the locking stud 416 does not extend into the notches 308 (FIG. 3) in the first seat track 214. In some examples, when the locking stud 416 is in the retracted position, a bottom surface 502 of the locking stud 416 is flush with the bottom surface 408 of the body 400 or above the bottom surface 408 of the body 400. In other examples, when the locking stud 416 is in the retracted position, the bottom surface 502 of the locking stud 416 extends beyond the bottom surface 408 of the body 400, as long as the locking stud 416 does not extend into the notches 308 in the first seat track 214. In the extended position, which is the position shown in FIGS. 4 and 5, the locking stud 416 extends outward from the recess 500 and beyond the bottom surface 408 of the body 400. When the first seat fitting 218 is disposed on the first seat track 214 and the locking stud 416 is in the extended position, the locking stud 416 extends into two adjacent notches 308 in the first seat track 214. The locking stud 416 is offset from the spacing of the first, second, and third fixed studs 410-414 such that when the locking stud 416 is disposed in two of the notches 308, the first, second, and third fixed studs 410-414 are disposed below the ribs 310 (FIG. 3). As such, the first, second, and third fixed studs 410-414 prevent the first seat fitting 218 from being moved away from the first seat track 214, and the locking stud 416 prevents the first seat fitting 218 from sliding along the first seat track 214. As a result, the first seat fitting is attached (e.g., locked) to the first seat track 214.

Figure 6A:
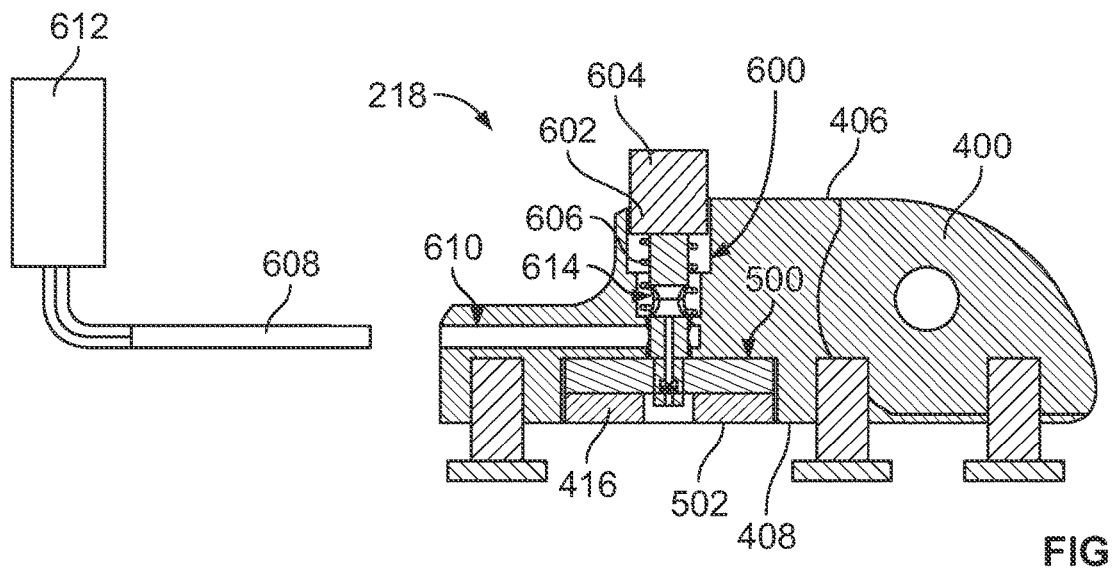
FIGS. 6A, 6B, and 6C illustrate an example sequence of moving an example locking stud of the example seat fitting of FIGS. 4 and 5 from a retracted position to an extended position.
Figure 6B:
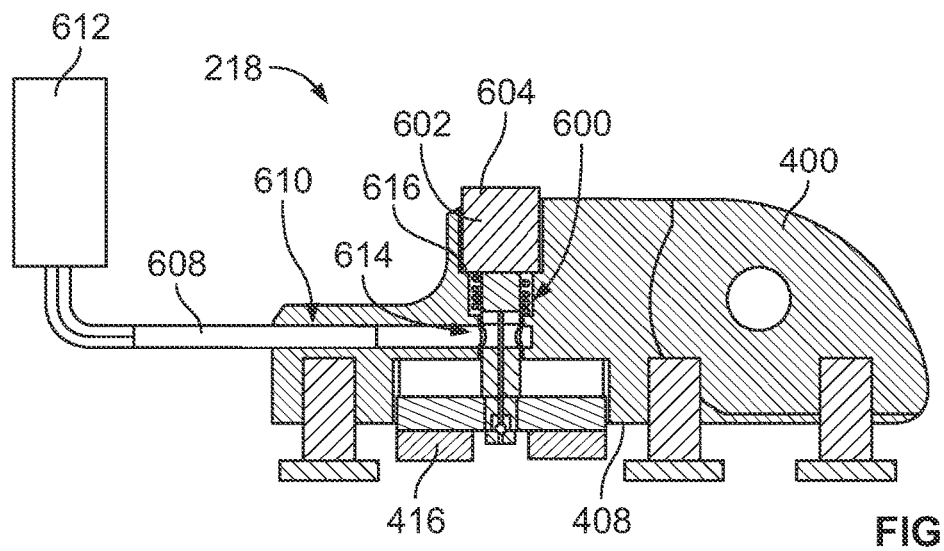
Figure 6C:
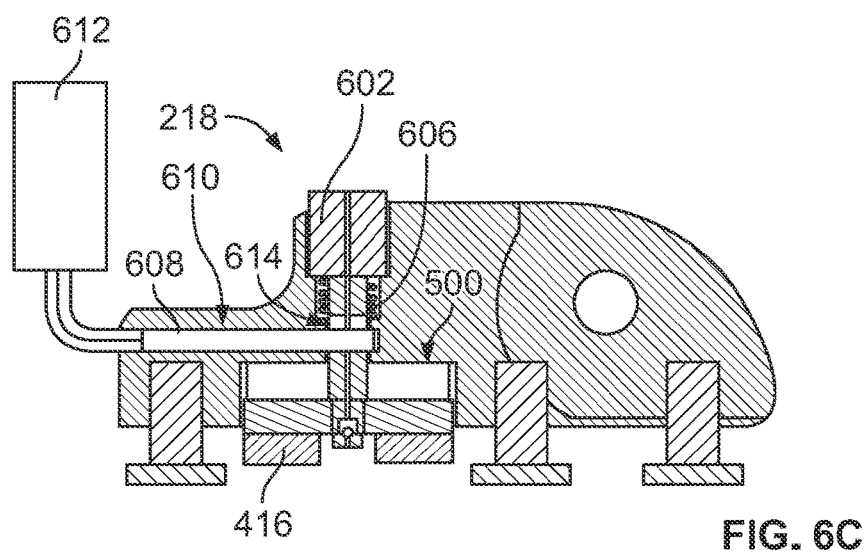

FIGS. 6A, 6B, and 6C are cross-sectional views of the example first seat fitting 218 showing an example sequence of moving the locking stud 416 from the retracted position to the extended position. The example sequence may be performed to connect the first seat fitting 218 to the first seat track 214 (FIGS. 2 and 3).

As shown in FIG. 6A, the body 400 has a first channel 600 defined between the top surface 406 and the recess 500 formed in the bottom surface 408. The first seat fitting 218 includes a plunger 602 that is disposed in the first channel 600 and coupled to the locking stud 416. A top portion 604 of the plunger 602 extends outward from the top surface 406 of the body 400. The plunger 602 is movable up and down in the first channel 600 to move the locking stud 416 into and out of the recess 500 between the retracted position and the extended position. In FIG. 6A, the locking stud 416 is in the retracted position. As such, the locking stud 416 is retracted into the recess 500. In this example, the bottom surface 502 of the locking stud 416 is flush or even with the bottom surface 408 of the body 400.

In the illustrated example, the first seat fitting 218 includes a spring 606 disposed in the first channel 600. The spring 606 biases the plunger 602 out of the top surface 406 of the body 400 and, thus, biases the locking stud 416 to the retracted position. The example first seat fitting 218 also includes an example pin 608 shown in FIG. 6A. The pin 608 is used to lock the locking stud 416 in the extended position, as disclosed in further detail herein. The pin 608 is insertable into a second channel 610 formed in the body 400. The second channel 610 connects to the first channel 600. In this example, the second channel 610 is transverse (e.g., perpendicular) to the first channel 600. Also shown in FIG. 6 is an example tool 612 that can be used to insert and/or remove the pin 608 into/from the second channel 610. The tool 612 can be carried by a person, for example. As shown in FIG. 6A, the plunger 602 has an opening 614. In the retracted position in FIG. 6A, the opening 614 is not aligned with the second channel 610.

To move the locking stud 416 from the retracted position to the extended position, a person may push down on the plunger 602. For example, a person may step on the top portion 604 of the plunger 602 with his/her foot. This moves the plunger 602 into the first channel 600, which moves the locking stud 416 outward from the bottom surface 408 of the body 400 to the extended position, as shown in FIG. 6B. As shown in FIG. 6B, the top portion 604 of the plunger 602 engages a ledge 616 in the first channel 600, which provides a stop or limit to indicate the locking stud 416 is in the extended position. When the locking stud 416 is in the extended position, the opening 614 in the plunger 602 is aligned with the second channel 610. Then, the pin 608 can be inserted (e.g., via the tool 612) through the second channel 610 and into the opening 614.

FIG. 6C shows the pin 608 inserted into the second channel 610 and the opening 614 in the plunger 602. The tool 612 may release the pin 608. The pin 608 remains in the second channel 610 and the opening 614. Thus, the locking stud 416 is held in the extended position by the pin 608. As disclosed above, when the locking stud 416 is in the extended position, the locking stud 416 prevents the first seat fitting 218 (and, thus, the seat 200 (FIG. 2)) from sliding forward or backward along the first seat track 214 (FIGS. 2 and 3). Therefore, the first seat fitting 218 cannot move forward or backward to be removed from the first seat track 214.

To release the first seat fitting 218 from the first seat track 214 (FIGS. 2 and 3), the example sequence may be performed in reverse. For example, the tool 612 can be inserted into the second channel 610 and pull the pin 608 out of the opening 614 in the plunger 602. Once the pin 608 is clear of the opening 614, the spring 606 biases the plunger 602 upward, which moves the locking stud 416 back into the recess 500 to the retracted position (FIG. 6A). Once the locking stud 416 is in the retracted position, the seat 200 (FIG. 2) can be slid forward or backward along the first seat track 214 (FIGS. 2 and 4) to a new position and/or removed from the first seat track 214. This example process can be similarly performed on the other seat fittings 220-224 (FIG. 2).

As shown in FIG. 6C, when the pin 608 is inserted into the opening 614 of the plunger 602, the pin 608 does not extend outward from the second channel 610 or beyond an outer surface of the body 400. In some examples, this prevents unintentional tampering with the pin 608, which could inadvertently release the first seat fitting 218 from the first seat track 214 (FIGS. 2 and 3). However, in other examples, the pin 608 may be longer such that a portion of the pin 608 extends outward from the second channel 610.

The tool 612 may be any tool used to insert the pin 608 and/or remove the pin 608. For example, the tool 612 may include an electromagnet. When the electromagnet is energized, the pin 608 is attracted to the electromagnet. The electromagnet can be de-energized to release the pin 608. As another example, the tool 612 may include a vacuum used to suction and hold the pin 608. The vacuum can be ceased to release the pin 608. As another example, the tool 612 may include a tip that can be actuated to grip the pin 608. The tip can also be de-actuated to release the pin 608. In some examples, the tool 612 is used to insert and retrieve the pin 608. In other examples, a person may insert the pin 608 without the tool 612. For example, a user may use his/her hands to insert the pin 608.

Therefore, in this example, the first seat fitting 218 does not require screwing a threaded shaft to extend or retract the locking stud as seen in known seat fittings. Instead, the example sequence of pushing on the plunger 602 and/or inserting/removing the pin 608 is relatively quick and simple compared to known seat fittings. As such, a user can quickly and efficiently attach or detach the seat 200 to/from the floor 202, which saves significant time and energy.

Figure 7:
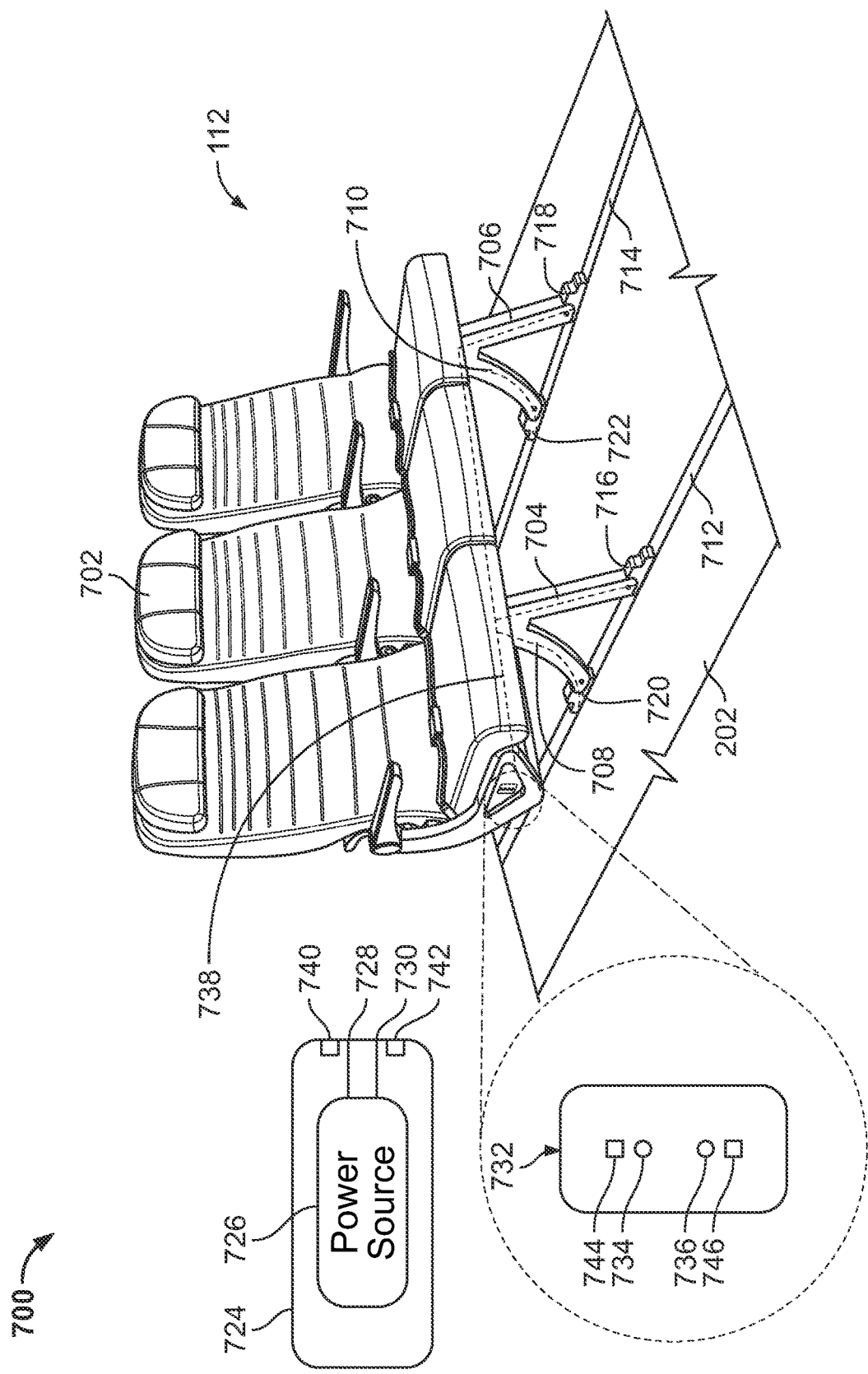
FIG. 7 illustrates an example seat and an example seat attachment system including example seat tracks and example seat fittings that may be used to attach the seat to a floor in a cabin of the aircraft of FIG. 1.

FIG. 7 illustrates another example seat attachment system 700 that may be used to removably couple an example seat 702 to the floor 202 in the cabin 112 of the aircraft 100 (FIG. 1). While only one seat 702 is shown, it is understood that cabin 112 may include multiple rows of seats, the same as or different than the seat 702, disposed in front of and/or behind the seat 702. In the illustrated example, the seat 702 includes three individual seating positions (e.g., forming a seat unit or bench). In other examples, the seat 702 may include more or fewer individual seating positions (e.g., one, two, four, five, etc.).

In the illustrated example, the seat 702 includes four legs, including a first leg 704, a second leg 706, a third leg 708, and a fourth leg 710. In other examples, the seat 702 can include more or fewer legs. The seat attachment system 700 includes seat fittings for attaching the legs 704-710 to example first and second seat tracks 712, 714 disposed in the floor 202 of the cabin 112. In particular, in this example, the seat attachment system 700 includes a first seat fitting 716 coupled to the first leg 704, a second seat fitting 718 coupled to the second leg 706, a third seat fitting 720 coupled to the third leg 708, and a fourth seat fitting 722 coupled to the fourth leg 710. The first and third seat fittings 716, 720 couple the respective first and third legs 704, 708 to the first seat track 712, and the second and fourth seat fittings 718, 722 couple the respective second and fourth legs 706, 710 to the second seat track 714. The seat fittings 716-722 can be coupled (e.g., locked) to the first and second seat tracks 712, 714 to attach to the seat 702 to the floor 202, or decoupled (e.g., unlocked) from the first and second seat tracks 712, 714 to detach the seat 702 from the floor 202. For example, the seat 702 can be detached from the first and second seat tracks 712, 714 and moved to another location on the first and second seat tracks 712, 714 and re-attached to the first and second seat tracks 712, 714.

The first and second seat tracks 712, 714 may be flush with the floor 202 or recessed below the floor 202. In some examples, carpeting or other flooring material is disposed over the first and second seat tracks 214, 216 between the rows of seats. The first and second seat tracks 712, 714 may be relatively long (e.g., 30 feet), such that multiple rows of seats can be coupled to the first and second seat tracks 712, 714. For example, the first and second seat tracks 712, 714 may extend along a length of the fuselage 112 (FIG. 1). The seats in the cabin 112 may be disconnected from the first and second seat tracks 712, 714 and rearranged or reconfigured (e.g., spaced closer together, spaced further apart, removed from the cabin 112, etc.).

In this example, the seat fittings 716-722 are electromechanically actuated. The seat fittings 716-722 can be operated (e.g., activated or de-activated) to connect or disconnect the seat 702 to/from the first and second seat tracks 712, 714. Each of the seat fittings 716-722 includes a solenoid, an example of which is shown in further detail in connection with FIGS. 10A-10C. When the solenoids are energized, the seat fittings 716-722 are released or decoupled from the respective seat tracks 712, 714, and when the solenoids are de-energized, the seat fittings 716-722 are attached or coupled to the respective seat tracks 712, 714.

To energize the solenoids of the seat fittings 716-722, the example seat attachment system 700 includes a tool 724. The tool 724 can be carried and used by a person. In the illustrated example, the tool 724 includes a power source 726 and first and second terminals 728, 730 (e.g., electrical connectors, pins, or plugs). The power source 726 can be implemented by one or more batteries (e.g., an Alkaline battery, a lithium-ion battery, etc.). The seat attachment system 700 also includes an interface 732. In the illustrated example, the interface 732 is disposed on a side (e.g., the aisle side) of the seat 702. In other examples, the interface 732 can be disposed in other locations, such as on one of the seat fittings 716-722, on one of the legs 704-710, on an arm of the seat 702, etc. An enlarged view of the interface 732 is shown in the callout in FIG. 7. The interface 732 includes first and second terminals 734, 736 (e.g., electrical connectors, pins, or plugs). The seat 702 includes a wiring harness 738 (shown in dotted lines) that electrically couples the terminals 734, 736 of interface 732 to the seat fittings 716-722. The wiring harness 738 may extend through portions of the seat 702 and the legs 704-710.

When the tool 724 is attached to the interface 732, the first and second terminals 728, 730 of the tool 724 mate or connect with the first and second terminals 734, 736 of the interface 732. The terminals 728, 730, 734, 736 may be male or female terminals, for example. The power source 726 then powers or energizes the solenoids in the seat fittings 716-722. In some examples, the power source 726 automatically energizes the solenoids when the tool 724 is connected to the interface 732. In other examples, the tool 724 may include a button or trigger that, when activated, provides power to the solenoids. Energizing the solenoids causes the seat fittings 716-722 to release from the first and second seat tracks 712, 714. Therefore, a person can connect the tool 724 to the interface 732 to detach the seat 702 from the floor 202 so that the person can move the seat 702 to another location or remove the seat 702 from the cabin 112.

In some examples, the tool 724 and/or the interface 732 may include one or more features to help ensure proper connection/alignment of the terminals 728, 730, 734, 736 and/or hold the tool 724 on the interface 732. For example, as shown in FIG. 7, the tool 724 includes first and second magnets 740, 742 and the interface 732 includes first and second magnets 744, 746. When the tool 724 is engaged with the interface 732, the magnets 740, 742 on the tool 724 are magnetically attracted to the magnets 744, 746 on the interface 732. This helps maintain connection and alignment between the tool 724 and the interface 732. In some examples, the magnetic connection is sufficient to hold the tool 724 on the interface 732, such that a person can release the tool 724 and the tool 724 remains connected to the interface 732. While in this example the tool 724 and the interface 732 each include two magnets, in other examples, the tool 724 and/or the interface 732 may include more or fewer magnets. Further, one or more of the magnets 740, 742, 744, 746 can be replaced by pieces of magnetic material (e.g., a ferromagnetic material such as nickel).

Figure 8:
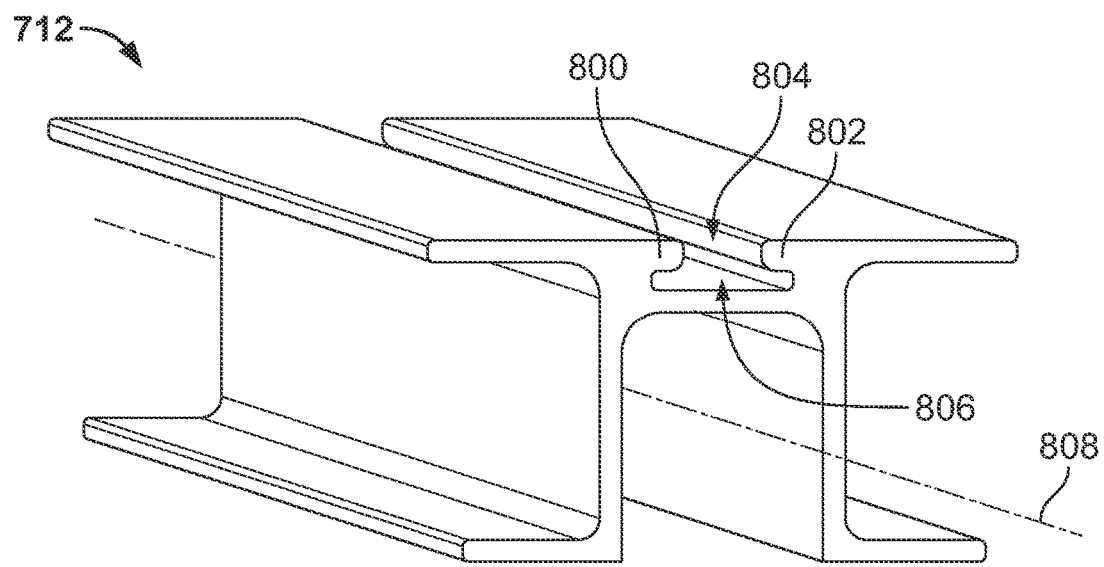
FIG. 8 illustrates a section of an example seat track of the example seat attachment system of FIG. 7.

FIG. 8 illustrates a section of the first seat track 712. The second seat track 714 (FIG. 7) is identical to the first seat track 712. Therefore, any structures or functions disclosed in connection with the first seat track 712 can likewise apply to the second seat track 714. In the illustrated example, the first seat track 712 has a first flange 800 and a second flange 802 separated from the first flange 800 by a slot 804. A channel 806 is defined below the first and second flanges 800, 802. The first seat track 712 has a longitudinal axis 808. In this example, the first and second flanges 800, 802 do not have notches or teeth like in the example of FIG. 3. This enables the first and third seat fittings 716, 720 (FIG. 7) to be disposed at any location along the first seat track 712. However, in other examples, the first and second seat tracks 712, 714 may be the same as the first seat track 214 shown in FIG. 3, which includes notches and ribs that define discrete positions where the first and third seat fittings 716, 720 can be attached.

Figure 9:
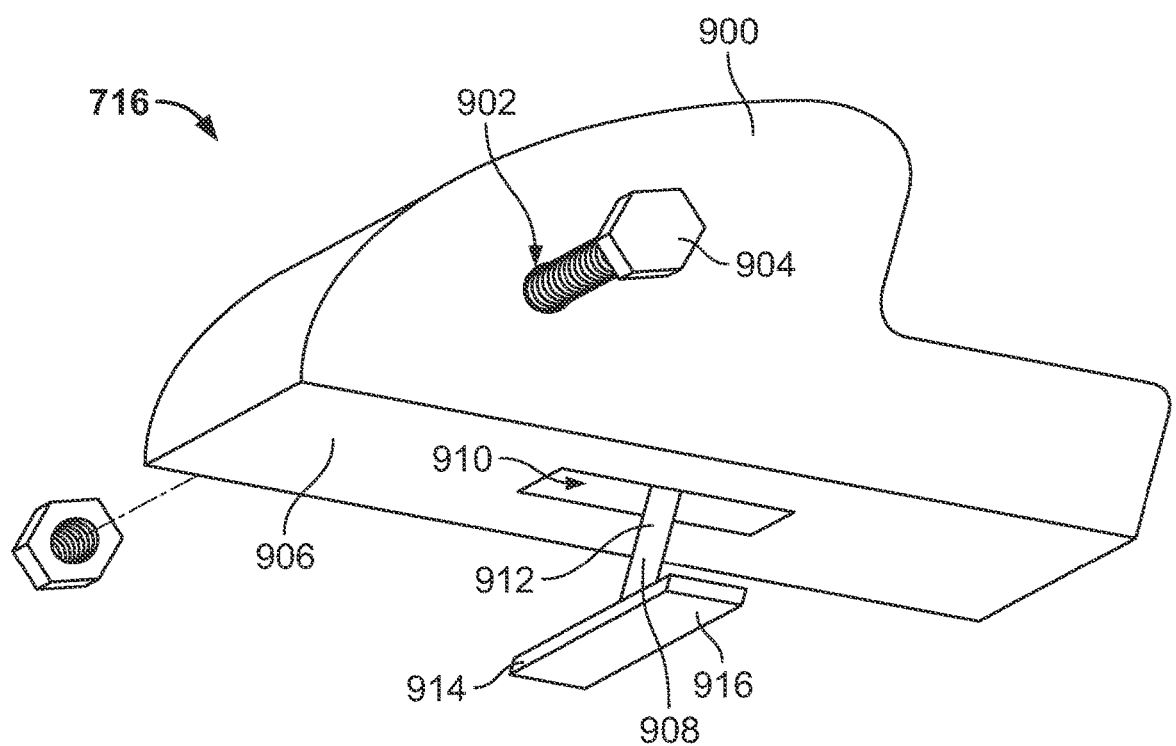
FIG. 9 is a bottom perspective view of an example seat fitting of the example seat attachment system of FIG. 7.

FIG. 9 is a perspective view of the first example seat fitting 716. The second, third, and fourth seat fittings 718, 720, 722 are identical to the first seat fitting 716. Therefore, any structure(s) or function(s) disclosed in connection with the first seat fitting 716 also apply to the second, third, and fourth seat fittings 718, 720, 722.

In the illustrated example, the first seat fitting 716 includes a body 900. In some examples, the body 900 is constructed of metal, such as aluminum. In other examples, the body 900 can be constructed of other materials. The body 900 is to be coupled to the first leg 704 (FIG. 7). In the illustrated example, the body 900 has a fastener opening 902. A fastener 904 (e.g., a bolt) is inserted through the fastener opening 902 and a corresponding opening in the first leg 704 to couple the body 400 to the first leg 704. In other examples, the first seat fitting 716 can be coupled to the first leg 704 via other mechanical and/or chemical fastening techniques (e.g., a rivet, friction fit, welding, an adhesive, etc.).

In the illustrated example, the body 900 has a bottom side or surface 906. The bottom surface 906 is to face the first seat track 712 (FIGS. 7 and 8) when the first seat fitting 716 is attached to the first seat track 712. In some examples, when the first seat fitting 716 is coupled to the first seat track 712, the bottom surface 906 contacts or engages the first seat track 712.

To couple the first seat fitting 716 to the first seat track 712 (FIGS. 7 and 8), the first seat fitting 716 includes a locking stud 908. As shown in FIG. 9, the locking stud 908 is extended outward from a recess 910 formed in the bottom surface 906 of the body 900. As disclosed in further detail herein, the locking stud 908 is movable into and out of the recess 910. In the illustrated example, the locking stud 908 has a stem 912 and an arm 914 coupled to a distal end of the stem 912. The arm 914 extends transverse (e.g., perpendicular) to the stem 912.

The locking stud 908 is movable between a first position, referred to as a retracted position, and a second position, referred to as an extended position (which is the position shown in FIG. 9). An example sequence of this movement in shown in further detail in connection with FIGS. 10A-10C. When the locking stud 908 is in the extended position, which is the position shown in FIG. 9, the locking stud 908 extends outward from the recess 910 and the bottom surface 906 of the body 900. Further, when the locking stud 908 is in the extended position, the arm 914 is orientated transverse (e.g., perpendicular) to the longitudinal axis 808 (FIG. 8) of the first seat track 712 (FIG. 8). When the first seat fitting 716 is disposed on the first seat track 712 the locking stud 908 is in the extended position, the locking stud 908 extends into the first seat track 712 to lock, attach, and/or otherwise couple the first seat fitting 716 to the first seat track 712.

When the locking stud 908 is in the retracted position, the locking stud 908 is retracted in the recess 910 such that the locking stud 908 does not extend into the first seat track 712 (FIGS. 7 and 8). In some examples, when the locking stud 908 is in the retracted position, a bottom surface 916 of the locking stud 908 does not extend beyond the bottom surface 906 of the body 900. In other words, the bottom surface 916 of the locking stud 908 may be aligned with or recessed relative to the bottom surface 906 of the body 900. This is advantageous because the first seat fitting 716 does not include any structures extending from the bottom surface 906 that could potentially damage the floor 202 (e.g., the carpet) when moving the seat 702 (FIG. 7). In other examples, when the locking stud 908 is in the retracted position, the bottom surface 916 of the locking stud 908 is disposed beyond or below the bottom surface 906 of the body 900, as long as the locking stud 908 is not rotated or turned into engagement with the first seat track 712. Further, when the locking stud 908 is in the retracted position, the locking stud 908 is rotated such that the arm 914 is orientated parallel to the longitudinal axis 808 (FIG. 8) of the first seat track 712.

Figure 10A:
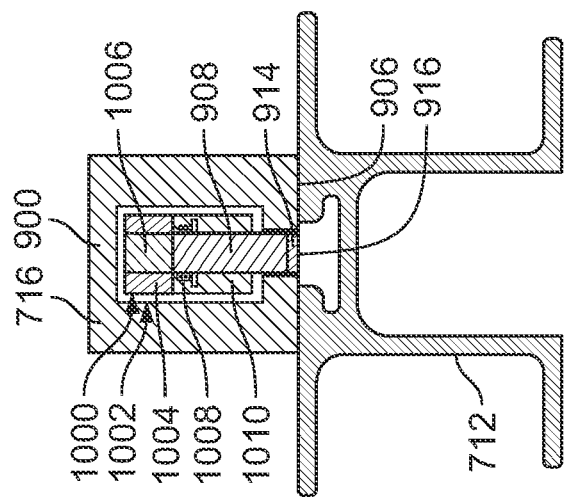
FIGS. 10A, 10B, and 10C illustrate an example sequence of moving an example locking stud of the example seat fitting of FIG. 9 from a retracted position to an extended position to attach the example seat fitting to the example seat track of FIG. 8.
Figure 10B:
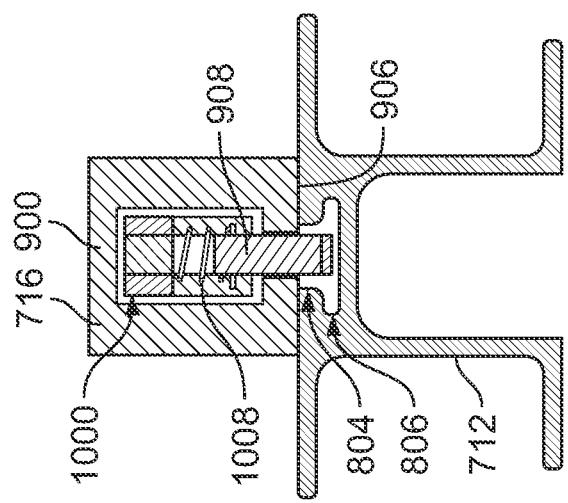
Figure 10C:
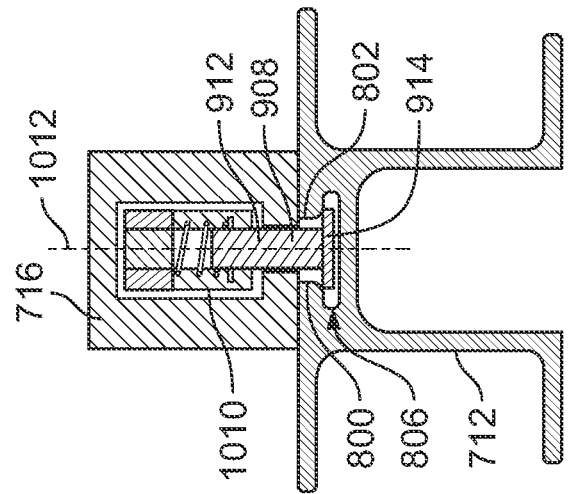

FIGS. 10A, 10B, and 10C are cross-sectional views of the example first seat fitting 716 and the first seat track 712 showing an example sequence of attaching the first seat fitting 716 to the first seat track 712. As shown in FIG. 10A, the first seat fitting 716 includes a solenoid 1000. In this example, the solenoid 1000 is a rotary-linear solenoid. The solenoid 1000 is operable to move the locking stud 908 between the retracted position in which the locking stud 908 is disposed in the body 900 and the extended position in which the locking stud 908 extends outward from the bottom surface 906 of the body 900 and into the first seat track 712. In FIG. 10A, the locking stud 908 is in the retracted position.

In the illustrated example, the solenoid 1000 is disposed in the body 900 of the first seat fitting 716. In particular, the solenoid 1000 is disposed in a cavity 1002 formed in the body 900. The solenoid 1000 includes a coil 1004 and a core 1006. When the coil 1004 is energized, the core 1006 attracts the locking stud 908 and moves the locking stud 908 upward in FIG. 10A to the retracted position. This occurs when a user attaches the tool 724 (FIG. 7) to the interface 732 (FIG. 7). As shown in FIG. 10A, the locking stud 908 is disposed inside of the body 900. In this example, in the retracted position, the bottom surface 916 of the locking stud 908 is aligned with the bottom surface 906 of the body 900. When the locking stud 908 is in the retracted position, the arm 914 is orientated parallel to the longitudinal axis 808 (FIG. 8) of the first seat track 712. The locking stud 908 remains in this position as long as the solenoid 1000 is energized. In the state shown in FIG. 10A, the first seat fitting 716 is not coupled to the first seat track 712. As such, the first seat fitting 716 (and, thus, the seat 702 (FIG. 7)) can be moved to another location on the first seat track 712 or removed from the first seat track 712.

In the illustrated example, the solenoid 1000 includes a biasing member, such as a spring 1008, to bias the locking stud 908 to the extended position when the solenoid 1000 is de-energized. In FIG. 10A, the spring 1008 has been compressed. The solenoid 1000 also includes a guide 1010. The guide 1010 causes the locking stud 908 to rotate near the end of its travel, as disclosed in further detail in connection with FIGS. 10B and 10C.

To lock the first seat fitting 716 to the first seat track 712, the person removes the tool 724 (FIG. 7) from the interface 732 (FIG. 9), which cuts off power and/or otherwise de-energizes the solenoid 1000. When the solenoid 1000 is de-energized, the spring 1008 biases the locking stud 908 outward from the bottom surface 906 of the body 900, as shown in FIG. 10B. As shown in FIG. 10B, the locking stud 908 is moved linearly through the slot 804 and into the channel 806 of the first seat track 712.

At the end of the linear motion of the locking stud 908, the guide 1010 causes the locking stud 908 to rotate or spin, as shown in FIG. 10C. The locking stud 908 rotates about an axis 1012 of the stem 912, for example. Therefore, when the solenoid 1000 is de-energized, the locking stud 908 moves away (e.g., linearly away) from the bottom surface 906 of the body 900 and rotates about an axis of the locking stud 908. In FIG. 10C, the locking stud 908 is in the extended position. Once the locking stud 908 is rotated, as shown FIG. 10C, the arm 914 is disposed below the flanges 800, 802 of the first seat track 712. This prevents the first seat fitting 716 from being moved away from the first seat track 712. Further, the arm 914 of the locking stud 908 is rotated into contact with the bottom surfaces of the flanges 800, 802.

Additionally or alternatively, the arm 914 may contact other surfaces of the first seat track 712 in the channel 806. The frictional engagement between the arm 914 and the first seat track 712 is sufficient to hold the first seat fitting 716 in place and prevent the first seat fitting 716 from moving along the first seat track 712. In some examples, the frictional engagement is sufficient to hold the seat 900 under certain loads (e.g., a 9 g-force) required by the Federal Aviation Administration (FAA). In some examples, the solenoid 1000 rotates the locking stud 908 about 90° (e.g., ±10°) from the position shown in FIGS. 10A and 10B to the position shown in FIG. 10C. Therefore in some examples, when the locking stud 908 is in the extended position, the arm 914 is orientated transverse (e.g., perpendicular) to the longitudinal axis 808 (FIG. 8) of the first seat track 712. In other examples, the locking stud 908 is rotated further than 90° or less than 90°. The amount of rotation can be optimized based on the length of the arm 914 and the shape of the channel 806, for example.

If a user desires to detach the first seat fitting 716 from the first seat track 712, the user can attach the tool 724 (FIG. 7) to the interface 732 (FIG. 7), which energizes the solenoid 1000. In such an instance, the solenoid 1000 pulls the locking stud 908 back into the body 900 to the retracted position. In particular, the locking stud 908 rotates about the axis 1012 and moves toward (e.g., linearly toward) the bottom surface 906 of the body 900, in the reverse sequence of FIGS. 10A-10C. Therefore, the locking stud 908 is moved from the extended position to the retracted position when the solenoid 1000 is energized, and the locking stud 908 is moved from the retracted position to the extended position when the solenoid 1000 is de-energized. The example seat attachment system 700 (FIG. 7) is advantageous because the seat fittings 716-722 do not require any power to remain fixed to the seat tracks 712, 714. Instead, power is only used for a short period of time to energize the solenoids when it is desired to detach the seat 702 from the seat tracks 712, 714. Further, the configuration of the solenoids acts as a failsafe, because if power is lost, the seats remain fixed to the seat tracks 712, 714.

In the illustrated example of FIG. 7 the tool 714 and the interface 732 include terminals to transfer power to the solenoids in the seat fittings 716-722. In other examples, the tool 724 and the interface 732 can include wireless power devices to wirelessly transmit power. For example, the tool 724 may include a transmitter coil and the interface 732 may include a receiver coil. The tool 724 can be placed closed to or in contact with the interface 732 to energize the solenoids.

As shown in FIG. 8, the first and second flanges 800, 802 of the first seat track 712 do not include any notches or ribs. As such, the first seat fitting 716 can be attached anywhere along the first seat track 712, which provides the ability to position the seat 702 anywhere along the first seat track 712. In other examples, the first seat fittings 716 can be used with a seat track that has notches and ribs, such as the seat track shown in FIG. 3. In such an instance, the locking stud 908 should be located under certain ones of the ribs 310.

Figure 11:
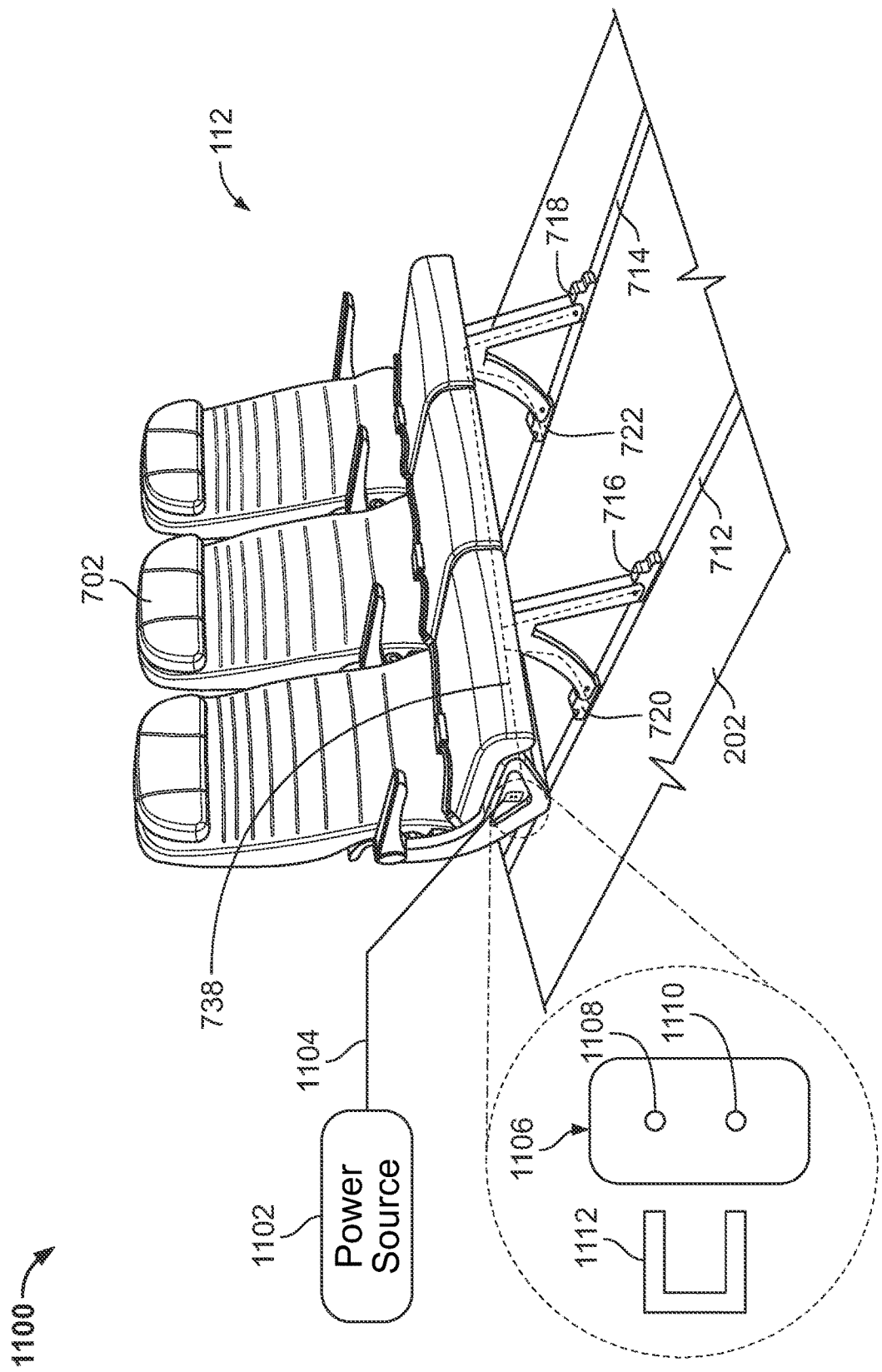
FIG. 11 illustrates an example seat and an example seat attachment system including example seat tracks and example seat fittings that may be used to attach the seat to a floor in a cabin of the aircraft of FIG. 1.

FIG. 11 illustrates another example seat attachment system 1100 used to attach a seat to the floor 202 in the cabin 112 of the aircraft 100 (FIG. 1). In FIG. 11, the seat 702, the seat tracks 712, 714, and the seat fittings 716-722 are the same as disclosed above in connection with FIG. 7. However, in this example, power is supplied to the seat 702 via a power source 1102, which is an electrical power source on the aircraft 100 (e.g., a battery, a generator, etc.). The seat 702 is electrically coupled to the power source 1102 via a wiring harness 1104. The wiring harness 1104 can provide power to the seat 702 for other devices, such as display screens on the seat 702. In other examples, power may be provided to the seat 702 via wireless power devices (e.g., a transmitter coil in the floor 202 and a receiver coil in the seat 702). In the illustrated example, the seat attachment system 1100 includes an interface 1106 on a side of the seat 702. An enlarged view of the interface 1106 is shown in the callout in FIG. 11. The interface 1106 includes a first terminal 1108 and a second terminal 1110. The first and second terminals 1108, 1110 are part of a circuit between the power source 1102 and the wiring harness 738 connected to the seat fittings 716-722. The seat attachment system 1100 includes a tool 1112. In this example, the tool 1112 is a jumper (e.g., a wire). When the tool 1112 is connected to the first and second terminals 1108, 1110 of the interface 1106, the tool 1112 completes the circuit such that power is supplied to the seat fittings 716-722 to energize the solenoids (e.g., the solenoid 1000 (FIG. 10A)). When the tool 1112 is detached from the interface 1106, the solenoids are de-energized. Thus, in this example, the tool 1112 carried by the user does not include a power source.

In another example, the interface 1106 may include a switch that can be activated by a unique radio frequency identification (RFID) signal. A person may carry a tool that emits the RFID signal. When the tool is brought close to the interface 1106 or connected to the interface, the RFID signal activates the switch, which closes the circuit to energize the solenoids.

Figure 12:
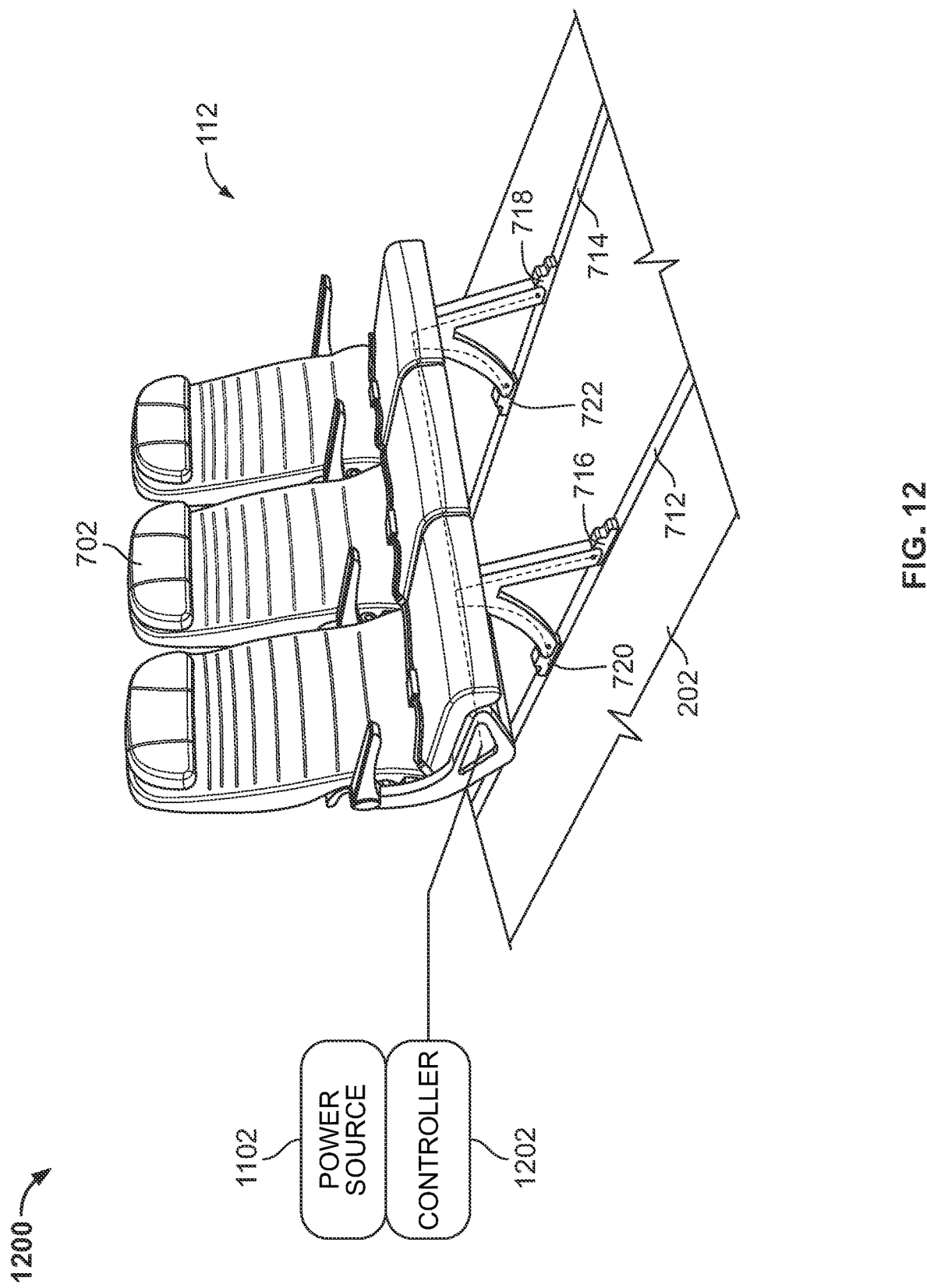
FIG. 12 illustrates an example seat and an example seat attachment system including example seat tracks and example seat fittings that may be used to attach the seat to a floor in a cabin of the aircraft of FIG. 1.

FIG. 12 illustrates another example seat attachment system 1200 used to attach a seat to the floor 202 in the cabin 112 of the aircraft 100 (FIG. 1). In FIG. 12, the seat 702, the seat tracks 712, 714, and the seat fittings 716-722 are the same as disclosed above in connection with FIGS. 7 and 11. Similar to FIG. 11, power is supplied to the seat 702 by the power source 1102. However, in this example, the seat 702 does not include an interface. Instead, the seat fittings 716-722 are energized remotely by a controller 1202. The controller 1202 regulates power to the solenoids in the seat fittings 716-720. The controller 1202 may be implemented by a device (e.g., a control panel with buttons, a touch screen display, etc.) in another part of the cabin 112 (e.g., in the cockpit, in a galley, etc.). A person can interact with the controller 1202 to energize the solenoids in the seat fittings 716-720 to detach the seat 702 from the first and second seat tracks 712, 714 and de-energize the solenoids in the seat fittings 716-722 to attach the seat 702 to the first and seat tracks 712, 714. In some examples, each seat is separately controllable. Therefore, a person can attach/detach one seat at a time or multiple seats at the same time.

FIG. 13 is a flowchart representative of an example method 1300 that may be performed to adjust a location of a seat in a vehicle. The example method 1300 is described in connection with the seat 702, the first seat track 712, and the first seat fitting 716 of FIGS. 7, 11, and 12. However, it is understood that the example method 1300 can be similarly performed in connection with the other example seat fittings 718-722 and/or the second seat track 714. The example method 1300 can be performed in connection with any of the example seat attachment systems 700, 1100, 1200 of FIGS. 7, 11, and 12.

At block 1302, the example method 1300 includes energizing the solenoid 1000 in the first seat fitting 716 coupled to the seat 702 to release the seat 702 from the first seat track 714 in the aircraft 100. When the solenoid 1000 is energized, the solenoid 1000 moves the locking stud 908 from the extended position in which the locking stud 908 extends from the bottom surface 906 of the body 900 to the retracted position in which the locking stud 908 is disposed within the body 900. In some examples, as shown in FIGS. 10A-10C, this movement from the extended position to the retracted position includes a rotation and a linear motion of the locking stud 908.

In some examples, the energizing of the solenoid 1000 includes coupling a tool to an interface on the seat 702 or the first seat fitting 716. In some examples, the tool includes a power source. For example, in the seat attachment system 700 of FIG. 7, the tool 724 can be coupled to the interface 732 on the seat 702. The tool 724 includes the power source 726. When the tool 724 is coupled to the interface 732 on the seat 702, the power source 726 energizes the solenoid 1000 in the first seat fitting 716. In other examples, such as in the seat attachment system 1100 of FIG. 11, the tool 1112 does not include a power source. In other examples, such as in the seat attachment system 1200, the solenoid 1000 can be energized remotely via the controller 1202.

At block 1304, the example method 1300 includes moving the seat 702 from a first location to a second location while the solenoid 1000 is energized (block 1304). For example, the seat 702 may be moved forward or backward to a new position on the first and second seat tracks 712, 714.

At block 1306, the example method 1300 includes de-energizing the solenoid 1000 to attach the first seat fitting 716 to the first seat track 714 while the seat 702 is at the second location (block 1306). In some examples, the de-energizing of the solenoid 1000 includes decoupling the tool from the interface. For example, in the seat attachment system 700 of FIG. 7, the tool 724 can be removed from the interface 732 on the seat 702, which de-energizes the solenoid 1000. As another example, in the seat attachment system 1100 of FIG. 11, the tool 1112 can be removed interface 1106 on the seat 702, which also de-energizes the solenoid 1000. In other examples, such as in the seat attachment system 1200, the solenoid 1000 can be de-energized remotely via the controller 1202.

When the solenoid 1000 of the first seat fitting 716 is de-energized, the locking stud 908 moves from the retracted position to the extended position, as shown in FIGS. 10A-10C, which attaches the first seat fitting 716 (and, thus, the seat 702) to the first seat track 712. The locking stud 908 is moved from the retracted position to the extended position via a force from the spring 1008.

While in this example the solenoid 1000 remains energized while the seat 702 is moved to the second position, in other examples, after the seat 702 is detached from the first seat track 712, the solenoid 1000 can be de-energized. The solenoid 1000 can then be re-energized before placing the first seat fitting 716 on the first seat track 712 and attaching the first seat fitting 716 to the first seat track 712.

While in some examples disclosed herein the solenoids are energized to detach the seat fittings 716-722 from the first and second seat tracks 712, 714 and de-energized to attach the seat fittings 716-722 to the first and second seat tracks 712, 714, in other examples, the solenoids can be configured to operate in reverse. In particular, the solenoids can be de-energized to detach the seat fittings 716-722 from the first and second seat tracks 712, 714 and de-energized to attach the seat fittings 716-722 to the first and second seat tracks 712, 714. In such an example, a constant supply of power may be needed to keep the solenoids in energized. For example, a power source (e.g., one or more batteries) may connected to the seat 702. In other examples, power may be supply via the wiring harness 1104.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example seat fittings, seat attachment systems, and methods disclosed herein can be used to easily and quickly attach/detach a seat to/from a floor in a vehicle. As a result, the examples disclosed herein enable rapid reconfiguration of seats, which saves time and expenses associated with changing a seating configuration. Some example seat fittings disclosed herein are also lighter and less expensive to manufacture. Further, some examples disclosed herein utilize specialized tools that reduce or prevent tampering of the seat fittings.

Example methods, apparatus, and articles of manufacture for attaching a seat to a floor in a vehicle are disclosed herein. Different aspects of the examples disclosed herein can be combined in other examples. Further examples and combinations thereof include the following clauses.

Claim 1 is a seat fitting for attaching a seat to a seat track in a vehicle. The seat fitting includes a body having a bottom surface to face the seat track, a locking stud, and a solenoid disposed in the body. The solenoid is operable to move the locking stud between a retracted position in which the locking stud is disposed in the body and an extended position in which the locking stud extends outward from the bottom surface of the body and into the seat track.

Clause 2 includes the seat fitting of Clause 1, wherein the locking stud is moved from the extended position to the retracted position when the solenoid is energized, and the locking stud is moved from the retracted position to the extended position when the solenoid is de-energized.

Clause 3 includes the seat fitting of Clause 2, wherein, when the solenoid is de-energized, the locking stud moves away from the bottom surface of the body and rotates about an axis of the locking stud.

Clause 4 includes the seat fitting of Clause 3, wherein, when the solenoid is energized, the locking stud rotates about the axis of the locking stud and moves toward the bottom surface of the body.

Clause 5 includes the seat fitting of Clause 3 or 4, wherein the solenoid rotates the locking stud about 90°.

Clause 6 includes the seat fitting of any of Clauses 1-5, wherein the locking stud has a stem and an arm coupled to a distal end of the stem, the arm extending transverse to the stem.

Clause 7 includes the seat fitting of Clause 6, wherein, when the locking stud is in the retracted position, the arm is orientated parallel to a longitudinal axis of the seat track, and when the locking stud is in the extended position, the arm is orientated transverse to the longitudinal axis of the seat track.

Clause 8 includes the seat fitting of any of Clauses 1-7, wherein the solenoid includes a spring to bias the locking stud to the extended position when the solenoid is de-energized.

Clause 9 includes the seat fitting of any of Clauses 1-8, wherein, when the locking stud is in the retracted position, a bottom surface of the locking stud does not extend beyond the bottom surface of the body.

Clause 10 is a method including energizing a solenoid in a seat fitting coupled to a seat to release the seat fitting from a seat track in a vehicle, moving the seat from a first location to a second location while the solenoid is energized, and de-energizing the solenoid to attach the seat fitting to the seat track while the seat is at the second location.

Clause 11 includes the method of Clause 10, wherein the energizing of the solenoid includes coupling a tool to an interface on the seat or the seat fitting.

Clause 12 includes the method of Clause 11, wherein the de-energizing of the solenoid includes decoupling the tool from the interface.

Clause 13 includes the method of Clause 12, wherein the tool includes a power source to energize the solenoid when the tool is coupled to the interface.

Clause 14 includes the method of any of Clauses 10-13, wherein, when the solenoid is energized, the solenoid moves a locking stud from an extended position in which the locking stud extends from a bottom surface of a body of the seat fitting to a retracted position in which the locking stud is disposed within the body of the seat fitting.

Clause 15 includes the method of Clause 14, wherein, when the solenoid is de-energized, the solenoid moves the locking stud from the retracted position to the extended position.

Clause 16 includes the method of Clause 15, wherein the solenoid includes a spring to move the locking stud from the retracted position to the extended position.

Clause 17 is a seat attachment system including a seat fitting to be coupled to a seat. The seat fitting includes a body having a top surface and a bottom surface, a channel defined between the top surface and a recess formed in the bottom surface, a locking stud disposed in the recess, the locking stud movable between a retracted position and an extended position, a plunger disposed in the channel and coupled to the locking stud, the plunger having an opening, and a pin insertable into the opening in the plunger to hold the locking stud in the extended position. The seat attachment system also includes a tool to remove the pin from the opening.

Clause 18 includes the seat attachment system of Clause 17, wherein the seat fitting includes a spring to bias the plunger out of the top surface of the body.

Clause 19 includes the seat attachment system of Clauses 17 or 18, wherein, when the locking stud is in the retracted position, a bottom surface of the locking stud is flush with the bottom surface of the body.

Clause 20 includes the seat attachment system of any of Clauses 17-19, wherein, when the pin is inserted into the opening, the pin does not extend beyond an outer surface of the body.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A seat attachment system comprising:
  a seat fitting to be coupled to a seat, the seat fitting including:
    a body having a top surface and a bottom surface, a channel of the body defined between the top surface and a recess formed in the bottom surface;
    a locking stud having a first semicircular portion and a second semicircular portion opposing the first semicircular portion, wherein a gap separates the first semicircular portion and the second semicircular portion across a longitudinal distance of the channel of the body, the locking stud disposed in the recess, the locking stud movable between a retracted position and an extended position;
    a plunger disposed in the channel of the body and coupled to the locking stud, the plunger having an opening; and
    a pin insertable into the opening in the plunger to hold the locking stud in the extended position; and
  a tool to remove the pin from the opening.

2. The seat attachment system of claim 1, wherein the seat fitting includes a spring to bias the plunger out of the top surface of the body.

3. The seat attachment system of claim 1, wherein, when the locking stud is in the retracted position, a bottom surface of the locking stud is flush with the bottom surface of the body.

4. The seat attachment system of claim 1, wherein, when the pin is inserted into the opening, the pin does not extend beyond an outer surface of the body.

5. The seat attachment system of claim 1, wherein the seat fitting includes a fixed stud extending from the bottom surface of the body.

6. The seat attachment system of claim 5, wherein the fixed stud includes a stem portion and a circular disc portion.

7. The seat attachment system of claim 5, wherein the fixed stud is a first fixed stud, further including a second fixed stud extending from the bottom surface of the body and a third fixed stud extending from the bottom surface of the body.

8. The seat attachment system of claim 7, wherein the locking stud is between the first fixed stud and the second fixed stud.

9. The seat attachment system of claim 1, wherein a portion of the plunger extends outward from the top surface of the body.

10. The seat attachment system of claim 1, wherein the channel of the body is a first channel, wherein the body has a second channel transverse to the first channel, the pin insertable into the second channel.

11. The seat attachment system of claim 10, wherein the second channel is aligned with the opening in the plunger when the locking stud is in the extended position.

12. The seat attachment system of claim 1, wherein the tool includes an electromagnet to attract the pin when the tool is energized and release the pin when the tool is de-energized.

13. The seat attachment system of claim 1, wherein concave portions of the semicircular portion and the second semicircular portion opposedly face one another.

14. A seat attachment system comprising:
a seat fitting to be coupled to a seat, the seat fitting including:
 a body having a top surface and a bottom surface, a channel of the body defined between the top surface and a recess formed in the bottom surface;
 a locking stud disposed in the recess, the locking stud movable between a retracted position and an extended position;
 a plunger disposed in the channel of the body and coupled to the locking stud, the plunger having an opening; and
 a pin insertable into the opening in the plunger to hold the locking stud in the extended position; and
a tool to remove the pin from the opening, wherein the channel of the body is a first channel, wherein the body has a second channel transverse to the first channel, the pin insertable into the second channel, and wherein the body has a ledge in the first channel, and wherein, when the locking stud is in the extended position, a top portion of the plunger engages the ledge in the first channel to indicate the locking stud is in the extended position.

15. A vehicle comprising:
a seat having a leg;
a seat track coupled to a floor of the vehicle, the seat track including a first flange and a second flange separated by a slot, the seat track defining a channel below the first flange and the second flange; and
a seat fitting coupled to the leg of the seat, the seat fitting to couple the seat to the seat track, the seat fitting including:
 a body having a top surface and a bottom surface, the bottom surface engaged with the first flange and the second flange of the seat track, the body including a recess formed in the bottom surface;
 a fixed stud extending from the bottom surface and into the channel of the seat track; and
 a locking stud formed by a first semicircular portion and a second semicircular portion, wherein a gap separates the first semicircular portion and the second semicircular portion across a longitudinal distance of the channel of the seat track, the locking stud disposed in the recess, the locking stud movable between a retracted position in the recess to enable the seat fitting to move along the seat track and an extended position out of the recess to lock the seat fitting to the seat track.

16. The vehicle of claim 15, wherein the first flange and the second flange include circular notches and ribs formed between the circular notches, the fixed stud insertable into the circular notches.

17. The vehicle of claim 16, wherein, when the fixed stud is disposed in the channel of the seat track and the locking stud is in the extended position, the locking stud is disposed in one or more of the circular notches and the fixed stud is disposed below one or more of the ribs.

18. The vehicle of claim 15, wherein the seat fitting includes a pin insertable into a channel in the body to hold the locking stud in the extended position.

19. A method comprising:
removing a pin from an opening of a plunger of a seat fitting to move a locking stud of the seat fitting from an extended position to a retracted position, the seat fitting to couple a leg of a seat to a seat track, the plunger coupled to the locking stud;
moving the seat from a first location to a second location while the locking stud is in the retracted position;
pushing the plunger of the seat fitting to move the locking stud from the retracted position to the extended position to cause the locking stud to be inserted into a channel of the seat track while the seat is in the second location, wherein the locking stud includes a first semicircular portion and a second semicircular portion separated by a gap extending across a longitudinal distance of the channel; and
inserting the pin into the opening to hold the locking stud in the extended position.

20. The method of claim 19, wherein the removing and the inserting of the pin includes using a tool to remove and insert the pin.

* * * * *